UNITED STATES PATENT OFFICE.

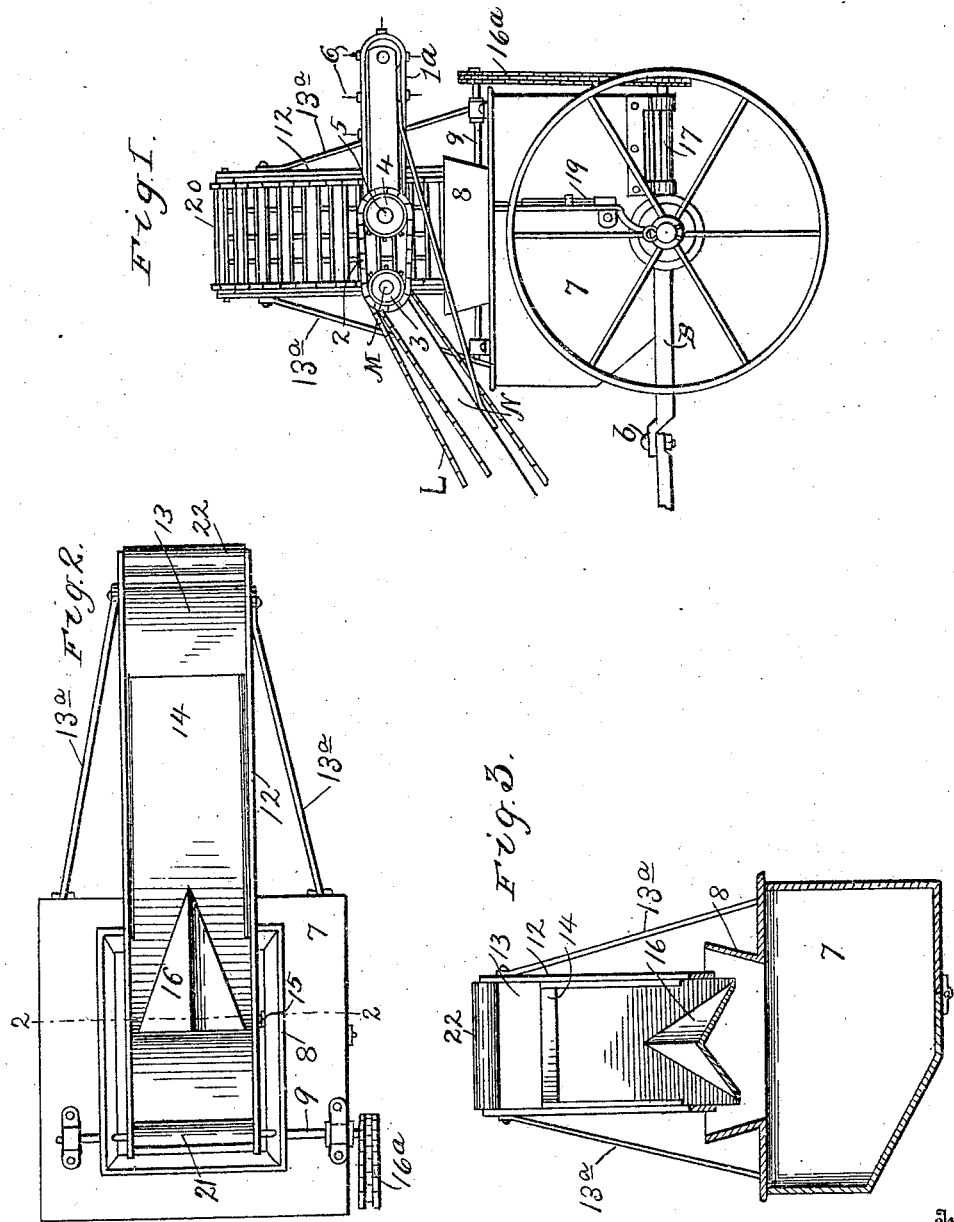

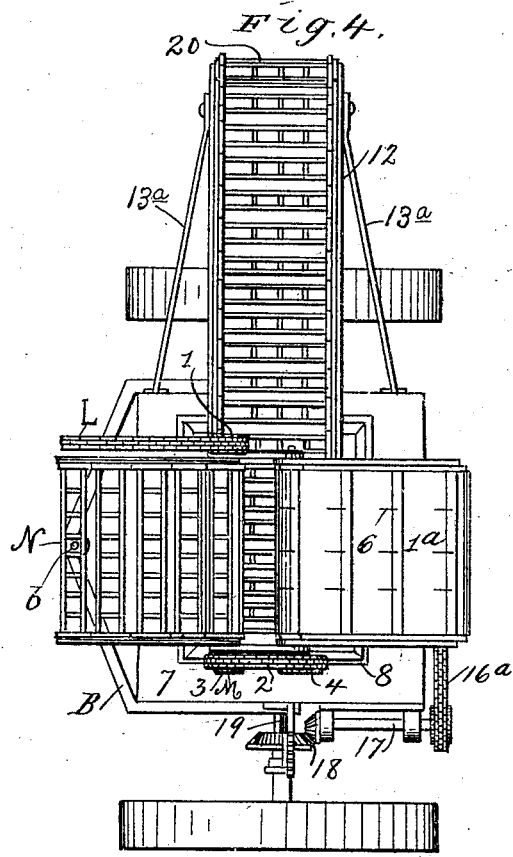

ROBERT W. McKAY, OF WINTHROP, IOWA.

POTATO-DIGGER.

954,042.  Specification of Letters Patent.  Patented Apr. 5, 1910.

Original application filed March 5, 1908, Serial No. 419,307. Divided and this application filed July 20, 1908. Serial No. 444,459.

*To all whom it may concern:*

Be it known that I, ROBERT W. MCKAY, a citizen of the United States of America, residing at Winthrop, in the county of Buchanan and State of Iowa, have invented certain new and useful Improvements in Potato-Diggers, of which the following is a specification.

This invention relates to separators and sizers for potato digging machines and is designed to travel with a potato digger and conveyer for the purpose of receiving the potatoes from the digger conveyer in order that weeds and other foreign substances may be separated from the potatoes and the potatoes separated according to size and delivered into separate receptacles.

An object of this invention is to provide novel means for removing small potatoes from larger potatoes by gravity, means being also provided for collecting the small potatoes in a body or receptacle in communication with the separating device.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, in which—

Figure 1, illustrates a side elevation of a truck and a potato separator in operative relation to a conveyer of a potato digger; Fig. 2, is a top plan view of the separating device with its conveyer and other parts omitted; Fig. 3, is a sectional view on the line 2—2 of Fig. 2; Fig. 4, is a plan view of the apparatus shown in Fig. 1; and Fig. 5, is a longitudinal sectional view of the frame and chute of the carrier.

In these drawings B, denotes a frame adapted to be coupled to a frame of an excavator through the medium of a pin $b$, and said frame of the excavator is designed to support a conveyer N, having journaled in its upper end a shaft M, on which a sprocket wheel 3, is mounted. The shaft M, is driven through the medium of a sprocket chain L, which runs over the sprocket wheel 1. The sprocket chain is driven in any suitable manner from the digger and as an example of a connection which is designed to accomplish this result, reference is made to my companion application, Serial Number 419,307, filed March 5, 1908, of which this is a division.

Ordinarily, vines and grass are not discharged from the potatoes when run over the primary conveyer of a digger and hence provision is made at the top of a primary conveyer for removing the said vines and grass. To that end a small carrier $1^a$, extends horizontally and projects from the frame of the machine. The carrier is driven by a sprocket chain 2, run over a sprocket wheel, 3, on the shaft M, and said sprocket chain is run over the sprocket wheel 4, on the shaft 5, journaled in the sides of the carrier frame $1^a$. The means for removing the vines and grass consists of an endless carrier having spikes or prongs 6, which will readily engage the vines and grass and accomplish the result stated.

The frame B supports a body 7, for the purpose of receiving the small potatoes which are separated from the larger potatoes by the separator carried by the said body 7. The body 7, is provided with a hopper 8, through which a shaft 9, passes and the said shaft 9, is provided with a drum 21, to receive the conveyer for separating the potatoes after they have been cleaned. Supported upon the body 7 and extending upwardly and outwardly therefrom, is an inclined frame 12, the lower end of which extends into the hopper 8. Between the sides of the frame 12, a chute 13, is suspended and the upper surface of the chute near the ends of the frame lies parallel to the edges of the frame. The chute has a depending portion 14, forming a box-like structure with openings 15, at the lower corners for the discharge of small potatoes. A deflector 16, is located in the bottom of the depending portion of the chute and by means of said deflector, potatoes are guided to the openings 15. The lower end of the conveyer frame and a part of the depending portion overlie the hopper, hence potatoes discharged through the openings 15, drop into the receptacle 7. The chute 13, is supported by the brace-rods $13^a$, attached to the outer surface near the end, said brace rods having their lower edges supported on the body 7.

The conveyer apron 20, is of open mesh construction to permit potatoes below a certain size to pass therethrough and said apron is run on drums 21, and 22, at the ends of the conveyer frame, and the drum 21, is mounted on the shaft 9, and by this means the separator is operated. The potatoes which are too large to pass through the conveyer apron, are carried over the drum 22 and deposited upon the ground from whence they may be readily recovered.

The separator shaft 9, is driven by the sprocket chain 16ª, which sprocket chain 16ª, is operated by the shaft 17, through the gearing 18, rotated from the axle of the rear truck; and said gearing is moved into and out of mesh by the lever 19.

I claim—

1. In a potato digging device, means for classifying into different sizes and separating the potatoes consisting of a chute, a hopper into which the chute projects, means for moving the potatoes to the chute, means for conducting the smaller potatoes to the hopper below the chute and means for depositing the larger potatoes upon the ground.

2. A potato digger having a separating device consisting of a chute, a hopper a conveyer for the chute, means for delivering potatoes to the conveyer above the hopper, means for conducting the smaller potatoes to the hopper below the chute and means for depositing the larger potatoes upon the ground.

3. A potato separating device consisting of a chute, a hopper to receive the smaller potatoes, a conveyer through which small potatoes pass, a deflector in the chute for directing the small potatoes to the sides of the chute, the walls of said chute having openings for the discharge of potatoes, and a hopper into which the chute discharges said conveyer adapted to deposit the larger potatoes upon the ground.

4. In a separating device for potatoes, a chute having a depending portion forming a box like structure with openings at the lower corners, a deflector located in the bottom of the depending portion of the chute for guiding potatoes to the openings, and a hopper into which the potatoes are discharged from the depending portion of the chute.

In testimony whereof I affix my signature in the presence of two witnesses.

ROBERT W. McKAY.

Witnesses:
W. COPELAND,
JOHN $\times$ DOBBINS.
his mark